June 30, 1959  L. T. WARD  2,892,576
METERING BUTTON VALVE ASSEMBLY
Filed Nov. 14, 1957  2 Sheets-Sheet 1
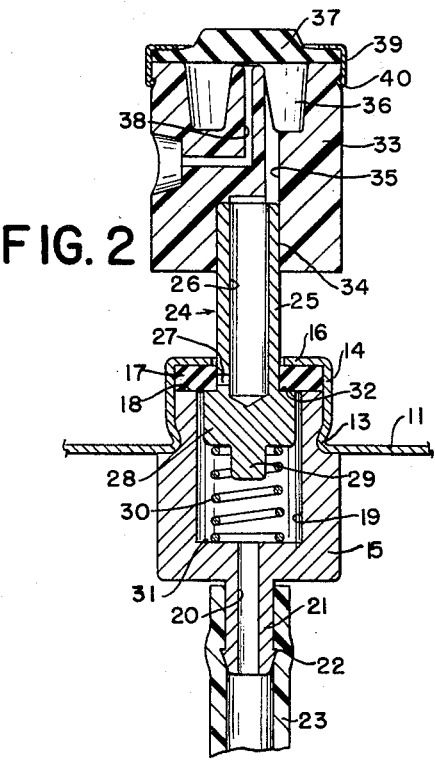
FIG. 2
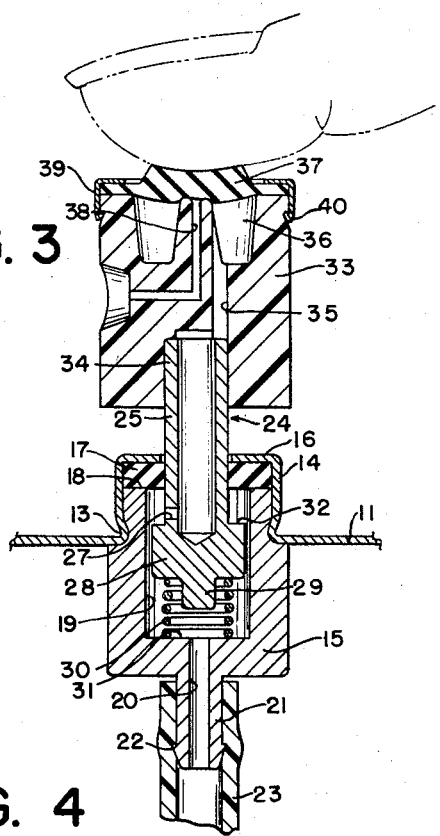
FIG. 3
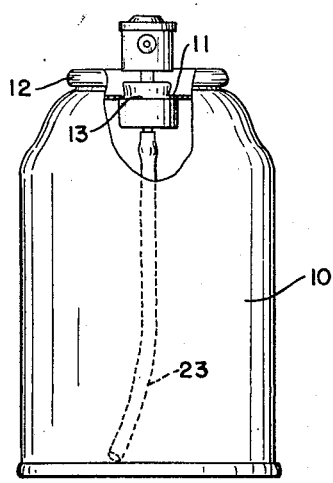
FIG. 1
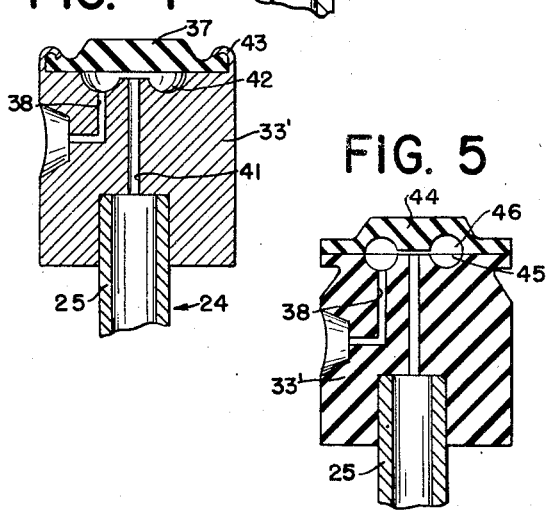
FIG. 4
FIG. 5
INVENTOR.
LAWRENCE T. WARD
BY Rennie, Edmonds,
Morton, Borrows & Taylor
ATTORNEYS June 30, 1959 L. T. WARD 2,892,576
METERING BUTTON VALVE ASSEMBLY
Filed Nov. 14, 1957 2 Sheets-Sheet 2

INVENTOR.
LAWRENCE T. WARD
BY
ATTORNEYS

United States Patent Office 2,892,576
Patented June 30, 1959

2,892,576

METERING BUTTON VALVE ASSEMBLY

Lawrence T. Ward, Portland, Pa.

Application November 14, 1957, Serial No. 696,475

7 Claims. (Cl. 222—394)

This invention relates generally to a metering valve assembly and more particularly to a valve assembly adapted for use with an aerosol type pressurized container wherein the metering means is included in a stem depressing button cap.

Metering valve assemblies used heretofore with aerosol type pressurized containers have involved a relatively large number of machined components which had to be constructed with a high degree of accuracy. These metering valve assemblies did not permit quick and economic filling of the pressurized containers with the material which was later to be metered therefrom.

I propose to overcome the aforementioned difficulties by providing generally for a stem depressing button cap which has therein a chamber of predetermined size, which in turn provides a space which determines the amount of spray to be metered from the pressurized container. This cap sealingly engages an end of a hollow depressable valve stem such as used in conventional non-metering aerosol valves. The cap is constructed with a minimum of parts and in certain embodiments of the invention may even be molded in a single piece. A discharge passage in the cap connects the chamber with the outside atmosphere and means are provided in the discharge passage for closing off the connection of the passage with the chamber when the cap is depressed and the chamber is in communication with the interior of the container through the hollow valve stem.

As is customary with non-metered products, the container intended for use with my invention is filled through the hollow stem of the conventional valve. After the container is filled, the stem of the valve is in its closed position outwardly of the container and the button cap constructed according to my invention is then placed on the end of the stem.

Referring to the drawings in which several preferred embodiments of my invention are illustrated, Fig. 1 illustrates a valve constructed according to my invention as applied to a conventional aerosol type container;

Fig. 2 is a cross-sectional view showing one form of a cap constructed according to my invention attached to a conventional hollow valve stem as used in conventional non-metering valves;

Fig. 3 illustrates the structure of Fig. 2 when the cap and stem are depressed by finger pressure;

Fig. 4 is a sectional view illustrating a slightly different embodiment of the button cap;

Fig. 5 is a cross-sectional view of another embodiment of my novel button cap;

Figure 6:
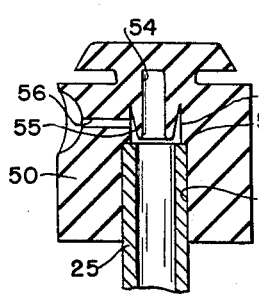
Fig. 6 is a cross-sectional view of still another form of the invention shown attached to a hollow valve stem.

Referring to the drawings, in which like parts have the same numerals, and in particular to Fig. 1, there is illustrated a conventional pressurized aerosol container 10 having a circular centrally apertured conventional top 11 which is secured to the container by a rolled-over edge 12. The top has a circular crimping groove 13 which along with a vertical cylindrical stud 14 grasps tubular valve housing 15, the latter parts being shown in Figs. 2 and 3.

The stud 14 is provided with an integral top horizontal wall 16. As shown in Figs. 2 and 3, an apertured resilient, preferably rubber or plastic sealer ring 17 is placed upon the top wall 18 of the valve housing 15 to make a gas-tight seal between the housing and ring at all times.

The conventional housing 15 is provided with a large circular bore hole 19 which communicates with an inlet conduit 20 which in turn is provided with an integral depending nipple 21. Nipple 21 is provided with a retaining ledge 22 in order to more effectively grasp a plastic or rubber resilient dip tube 23 which extends to the bottom of container 10.

A depressable hollow valve stem 24 has a top tubular cylindrical section 25 in which circular bore hole 26 terminates in a lateral port opening 27. The valve stem 24 has a central cylindrical section 28 of a larger diameter than section 25 but of a smaller diameter than bore hole 19 to permit passage of fluid therebetween. As is shown in Fig. 2, the valve stem 24 is disposed in the valve housing with the central section 28 placed in bore hole 19. The central section 28 has a button depending lug 29 and a coil spring 30 is placed about this lug 29 and upon the bottom wall 31 of housing 15.

The sealer ring 17 surrounds the exterior wall of section 25 in a gas-tight manner at all times. As shown in Figs. 2 and 3, the larger diameter central section 28 has a ledge 32 which functions as a valve seat to effect a gas-tight seal between the ring 17 and the ledge 32 when the valve stem is in normal non-finger actuated position as shown in Fig. 2, the stem being biased outwardly of the container by coil spring 30. The structure as described up to this point is conventional in many aerosol-type containers delivering non-metered spray and the novel button cap as shown in the drawings acting in combination with this conventional structure is the novel structure and produces the economical metering delivery of the invention.

A preferable form of my new stem-depressing button cap is shown in Fig. 2 in which 33 is a cap body having a bottom bore hole 34 shown sealingly engaging section 25 of the depressable valve stem. A conduit 35 leads from bore hole 34 and communicates with the interior 26 of the hollow stem. The body 33 has therein a chamber 36 of predetermined size, the top wall of the chamber being formed by a resiliently flexible diaphragm 37 which, upon the application of finger pressure, may seat to close off the connection of a discharge passage 38 from the outside atmosphere.

Flexible diaphragm 37 may be held on to the body 33 by means of a circular retainer ring 39 which is securely crimped into a groove 40 of the body 33.

Referring to Fig. 3, it is seen that when button cap body 33 is depressed by finger pressure, that the button cap in turn will depress hollow valve stem 24 opening port 27 to communicate with the interior of container 10. Fluid under pressure in container 10 will then be forced up through the hollow valve stem through the conduit 35 into the chamber 36. The fluid, however, will not be able to pass out to the atmosphere through discharge passage 38 since the flexible diaphragm 37 seals off the opening of the discharge passage into the chamber.

As finger pressure is removed from diaphragm 37 and the stem depressing button cap, spring 30 will force the hollow stem 24 outwardly of the container 10 to seal off port 27. At the same time diaphragm 37, since it is resilient and under gas pressure, will open the end of the discharge passage 38 to allow fluid contained in the interior of the hollow valve stem, conduit 35 and the predetermined chamber 36 to escape into the atmosphere. It is readily seen that the amount of spray to be metered from the container can be conveniently controlled by varying the size of chamber 36.

Fig. 4 illustrates a body 33' in which the predetermined chamber is of negligible size. A conduit 41 which is similar to the conduit 35 shown in Figs. 2 and 3 leads directly to communicate with discharge passage 38. The total fluid to be metered upon application of finger pressure will be determined by the size of conduit 41 and the interior of the hollow valve stem 24. The discharge passage 38 may end in an annular groove 42 so that diaphragm 37 may, upon the application of finger pressure, be depressed so as to seal off the end of conduit 41.

Fig. 4 further illustrates another form of attaching diaphragm 37 to the body 33'. Here an end portion 43 of the body may be bent around or molded to grasp and hold in sealing relationship the ends of diaphragm 37.

Fig. 5 illustrates still another method of attaching a resilient diaphragm to body 33'. Here the diaphragm 44 is heat sealed to a co-acting rubber or plastic button body 33' generally with the use of a suitable adhesive. Here both the body 33' and the diaphragm 44 are annularly grooved at 45 and 46, respectively, in order that the diaphragm may easily seat to seal off the end of conduit 41 and close the connection of it with discharge passage 38.

Figure 7:
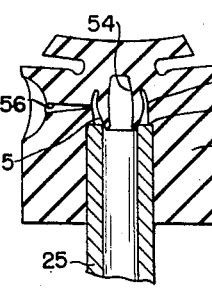
Fig. 7 is a cross-sectional view of the cap of Fig. 6 shown in a depressed state.

A form of my invention in which the stem-depressing button consists of a unitary molded part is shown in Figs. 6 and 7. The button body 50 is made of rubber or other pliable plastic and has therein a bore hole 51 which may sealingly surround the end of valve stem 24. A second bore hole 52 of smaller diameter than bore hole 51 is adjacent bore hole 51 so as to provide a retaining ledge 53. Still a third bore hole 54 of smaller diameter than bore hole 52 determines a chamber of predetermined size and is partly surrounded by a depending annular skirt 55. The body 50 is further provided with a discharge passage 56 communicating from the atmosphere to the interior of bore hole 52.

It is seen by referring to Fig. 7 that upon the application of finger pressure, that annular skirt 55 will seat with the end of the hollow valve stem to effectively seal off connection of the discharge passage 56 with the bore hole or predetermined chamber 54. This particular form of the invention is especially advantageous in that the complete button cap may be made in one operation and so cut down the expense of machining and assembling many parts.

Figure 8:
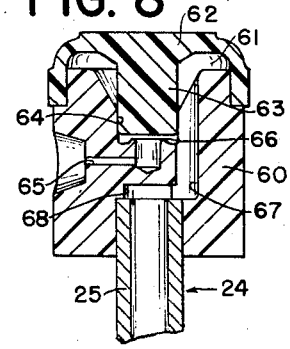
Fig. 8 is a cross-sectional view of a cap constructed according to the invention embodying a scavenging feature.

In order that fluids of high viscosity may be effectively metered from a pressure-type container, the structure according to my invention may take the form as shown in Fig. 8 in order to provide for an effective scavenging feature. Here the button body 60, as in the prior figures, sealingly surrounds the hollow valve stem 24. The predetermined chamber 61 is formed in the body and has as one side wall a flexible diaphragm 62. The flexile diaphragm 62 has a piston-like portion 63 which may ride in a partial cylindrical portion 64. The end of a discharge passage 65 terminates in an annular valve seat 66 and a passageway 67 joins the chamber 61 with bore hole 68 to provide constant communication of the predetermined chamber 61 with the interior of the hollow valve stem.

Figure 9:
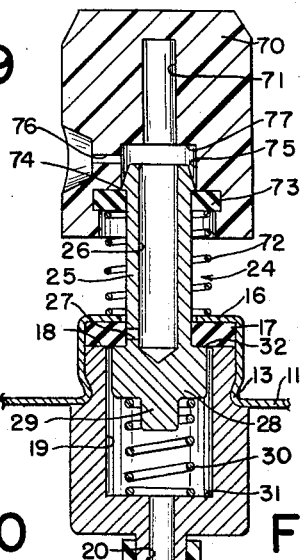
Fig. 9 is a cross-sectional view of another embodiment of my invention having in addition spring means biasing the cap outwardly of the hollow valve stem.

I show in Fig. 9 still another construction according to my invention. Here a button body 70 having therein a predetermined chamber 71 is biased outwardly from container 10 by means of a spring 72. In the particular construction shown in Fig. 9, the spring rests upon a retainer ring 73 which may be constructed of rubber or from other material in order to sealingly engage the end of a hollow valve stem 24. In order that the end of the hollow valve stem 24 will positively engage and abut the retainer ring 73, there is provided a ledge 74 on the end of stem 24.

Chamber 71 communicates with a bore hole of larger diameter 75 into which runs discharge passage 76. The diameter of chamber 71 is less than the interior diameter of the hollow stem so that when the button 70 is depressed against the force of springs 72 and 30, the end of the valve stem will seal on to the face 77 at the bottom of bore hole 75.

Figure 10:
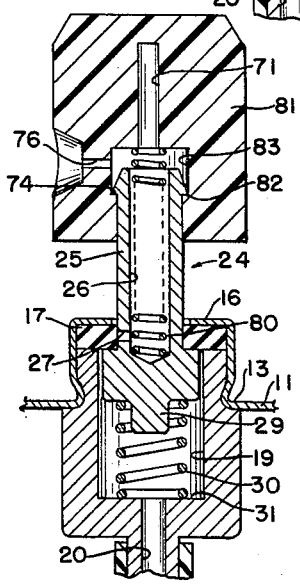
Fig. 10 is a cross-sectional view of a cap biased outwardly of the hollow valve stem by means different from that shown in Fig. 9.

It is apparent that spring 72 could be included in the interior of the hollow valve stem 24 to produce the same effect as that shown in Fig. 9. This construction is shown in Fig. 10 wherein a spring 80 is shown inside of hollow stem 24 biasing a cap 81 outwardly from the container. Cap 81 differs from cap 70 in that no provision has to be made for a retainer ring for the spring to act on since the spring in this case bears directly upon the button cap. The cap 81 is retained upon stem 24 by an interior face 82 which may bear directly on face 74. A circular groove 83 is provided to produce a gas-tight sealing connection to the end of valve stem 24 similar to that shown in Fig. 9 upon application of finger pressure.

Figure 11:
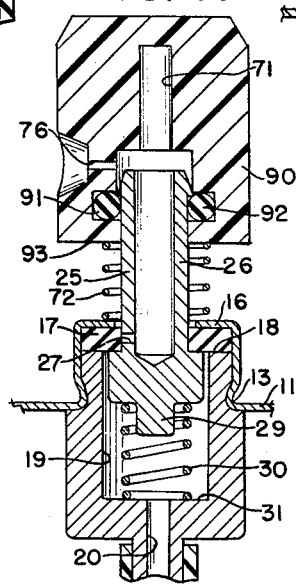
Fig. 11 is a partial cross-sectional view of a cap constructed according to my invention having different stem sealing means from that shown in Fig. 9.

In Fig. 11 there is illustrated still a different means of providing a sealing engagement between the cap and the valve stem. Here a body 90 has therein a groove 91 in which an O ring 92 may ride. The bottom of the body is formed by a portion 93 upon which spring 72 may bear. In all other respects the body is the same as that shown in Fig. 9.

Figure 12:
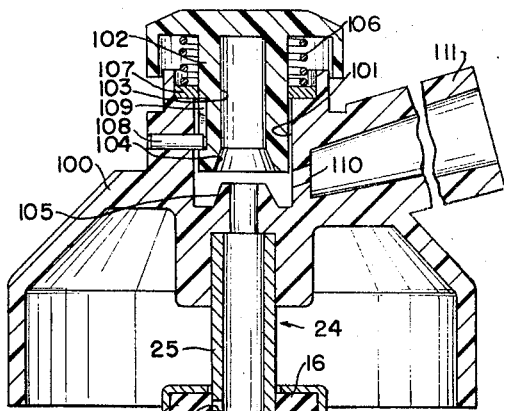
Fig. 12 is a cross-sectional view illustrating still another embodiment of a cap constructed according to my invention having a modified discharge passage.

A form of the invention which is particularly well adapted for dispensing high viscosity fluids, such as shaving creams, whipped creams, etc. is shown in Fig. 12. Here the button cap comprises a body 100 which may sealingly engage with the end of valve stem 24. The body 100 has therein a bore hole 101 in which a plunger 102 slides. Plunger 102 has therein a bore hole 103 which functions as a chamber of predetermined size. The bottom of plunger 102 has thereon a valve seat 104 which may cooperate with an annular part 105 of the body 100 to close the discharge passage from the predetermined chamber. Plunger 102 is biased outwardly of the body 100 by means of a spring 106 which bears at one end upon the plunger and upon the other end upon an annular seal 107. Seal 107 in turn bears directly upon the body 100.

A retainer ring or pin 108 passes through the body 100 to engage a groove 109 in the plunger 102. The body 100 has therein a discharge passage 110 having a nozzle 111 at one end connecting with the atmosphere.

It is readily seen that the operation of this device is the same as the others. That is the plunger 102 is pushed down against the bias of spring 106 to close off the connection of passage-way 110 with the predetermined chamber. Further depression of the plunger will depress the valve stem 24 and so open port 27 to the interior of the container. Fluid will then flow from the interior of the container up through the valve stem into the predetermined chamber. Upon release of finger pressure, spring 30 will force the hollow valve stem outwardly of the container and so close port 27. At the same time spring 106 will force plunger 102 outwardly of the body 100 and so open passage-way 110 to communicate with the interior of the hollow valve stem and the predetermined chamber in the plunger.

It is readily seen in all of the forms of my invention that in the event that the springs biasing the plunger having the predetermined chambers lose their resiliency, or if the diaphragms forming one end of the predetermined chambers become brittle with age, they will still be biased outwardly of the container by the fluid pressure therein.

A further advantage of my novel forms of metering button caps is that the container to which they are to be attached may be filled through the hollow stem in the same manner as it is done with conventional non-metering containers. Metering valves in use today prevent fast filling of the containers since the filling substance must pass around the metering passages in the metering valve. With my form of button cap, the substance does not pass through the cap upon filling since the cap is actually not attached to the stem until after the container is filled so that there are no obstructions to flow.

While I have described several forms of my novel stem depressing button metering cap, it is obvious that there are other forms that, while not specifically disclosed in this specification, may come within the scope of the invention as determined by the claims.

I claim:

1. A metering outlet valve assembly for a pressurized container having an outlet aperture comprising in combination: a hollow depressible operating stem resiliently biased outwardly from said container, the outer wall of said stem sealingly and slidably engaging the sides of said aperture, and an opening through said outer wall movable inward from sealing engagement with said sides to connect the interior of said stem with the interior of said container; and a button cap mounted in sealing contact around the outer end of said stem, a chamber of predetermined capacity in said cap, a discharge passage through said cap connecting with said chamber, said chamber being in communication with the interior of said stem, and means operable by depression of said cap for closing off the connection of said passage with said chamber before said stem is depressed and before said opening is brought in communication with the interior of said container.

2. A button cap to engage sealingly and operatively the outer end of a hollow depressible operating stem and discharge passage of a dispensing valve for a pressurized container comprising: a body portion having therein a chamber of predetermined size adapted to communicate with the interior of said hollow stem; a discharge passage through said body portion connecting with said chamber; and means carried by said body portion operable by depression of said cap for closing said discharge passage off from said chamber when said button cap is depressed.

3. A button cap according to claim 2 wherein said chamber comprises an annular groove in said body, an opening of said discharge passage being in the center of said body surrounded by said annular groove and communicating with said chamber, and said valve means comprising a flexible diaphragm forming one end of said body and a side wall of said chamber; said diaphragm sealingly engaging said opening upon finger pressure to close the connection of said passage with said chamber.

4. A cap according to claim 2 wherein said chamber comprises in part a conical portion and a cylindrical portion having at the bottom thereof an annular valve seat, said passage terminating in said chamber in a port surrounded by said valve seat, said means operable to close off said passage comprising a piston movable in said cylindrical portion to engage said valve seat, and said cylindrical portion being adjacent to said conical portion to provide a scavenging area.

5. A button cap to engage sealingly and operatively the outer end of a hollow depressible stem and discharge passage of a pressurized container comprising: a unitary pliable body having therein a predetermined chamber adapted to communicate with the interior of said hollow valve stem, a discharge passage in said body connecting said chamber, and a portion of said pliable body adapted upon application of finger pressure to close the connection of said passage with said chamber.

6. A button cap to sealingly and operatively engage a depressible hollow stem of a pressurized container, comprising a cup-shaped body having therein a chamber of predetermined size, the interior sides of said cup-shaped body adapted to slidably and sealingly engage an end of said hollow stem, a discharge passage connecting with said chamber, and an interior opening of said passage in said body located in an interior side wall of said cup-shaped body, said opening adapted to be closed off from said chamber when said stem is depressed.

7. A metering outlet valve assembly for a pressurized container having an outlet aperture comprising in combination: a hollow depressible operating stem sealingly and slidably engaging the sides of said aperture, an opening in the side of said hollow stem adapted to be sealed by the sides of said aperture in one position of said stem and to extend into the interior of said pressurized container in another position of said stem, first spring means biasing said stem outwardly from said aperture; and a cup-shaped stem depressing button cap having therein a chamber of predetermined size sealingly and slidably surrounding an end of said stem, second spring means biasing said cap away from the end of said stem, a discharge passage extending through the side walls of said cup-shaped body connecting with said chamber, and the interior opening of said passage in said body adapted to be sealed by said stem to cut off said connection when said cap is depressed.

References Cited in the file of this patent

UNITED STATES PATENTS

| | | |
|---|---|---|
| 2,631,814 | Abplanalp | Mar. 17, 1953 |
| 2,701,163 | Teller | Feb. 1, 1955 |
| 2,746,796 | St. Germain | May 22, 1956 |
| 2,772,814 | Meyers | Dec. 4, 1956 |